June 20, 1950     B. H. URSCHEL     2,512,186
VEHICLE AXLE
Filed April 2, 1947
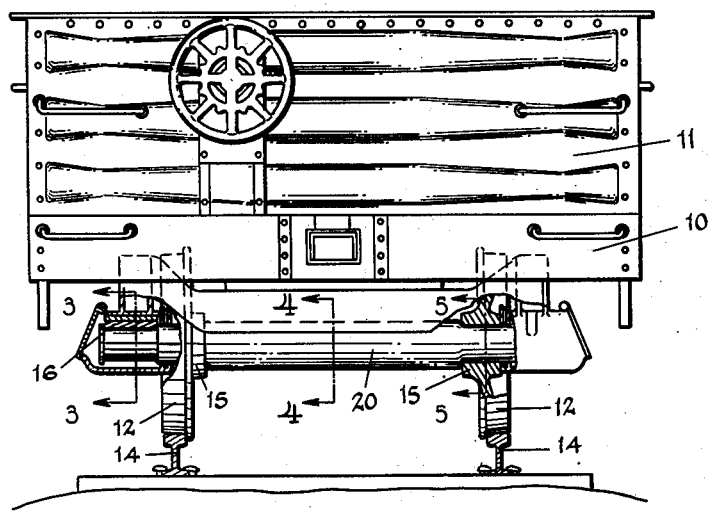
Fig 1
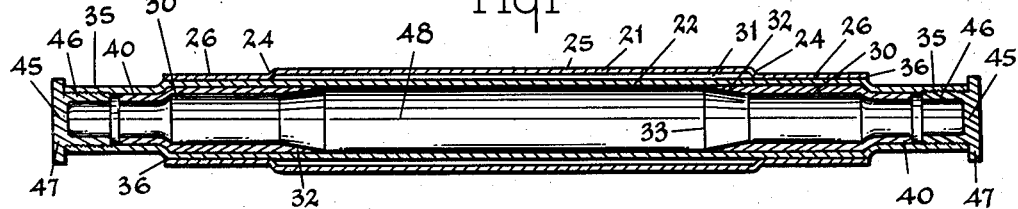
Fig 2
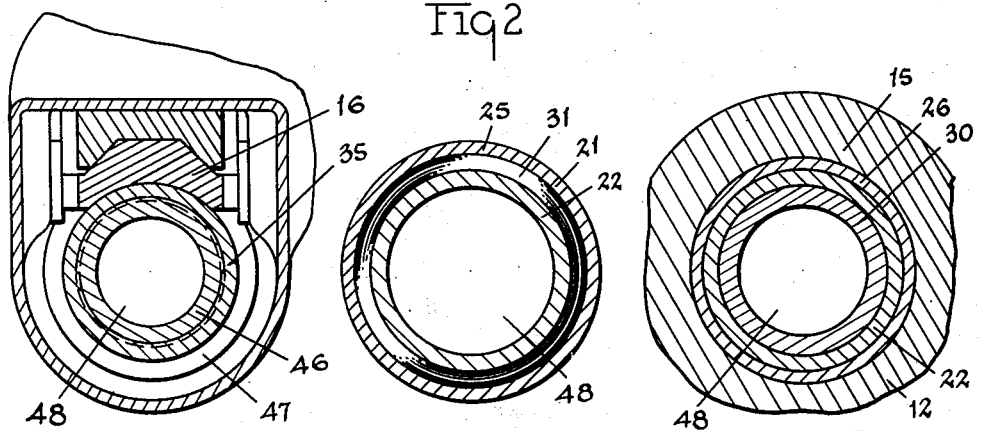
Fig 3     Fig 4     Fig 5
Inventor
Bertis H. Urschel
By Freeman Campston
Attorney

Patented June 20, 1950

2,512,186

UNITED STATES PATENT OFFICE 2,512,186

VEHICLE AXLE

Bertis H. Urschel, Bowling Green, Ohio, assignor to The Urschel Engineering Company, Bowling Green, Ohio, a corporation of Ohio Application April 2, 1947, Serial No. 738,885

7 Claims. (Cl. 295—36)

My invention relates to a load-bearing and wheeled-vehicle axle. The invention particularly relates to such an axle comprising a plurality of concentrically disposed nesting tubes, each of a length equal to at least the distance between the bearing surfaces of the hubs of the opposite vehicle wheels adapted to be supported on the axle. The invention readily lends itself to providing an axle for a railroad car.

My invention has for its object to provide an exceedingly light weight axle of the class described having a greater capacity to support load and withstand stress than other axles heretofore used, including the conventional forged axle of present-day railroad car use.

It has been proposed heretofore to make an axle utilizing a plurality of small tubes arranged in lineal parallelism to form the core, about which a molten metal axle body is cast to complete an axle with a cellular cross-section. Also, it has been proposed, heretofore, to make an axle utilizing a tube which extends from wheel hub to wheel hub and which has sleeve tubular inserts, in each of its ends to reinforce the tube in the zones of prevailing shear exerted by the wheel hub and journal bearing. In order to provide a journal bearing roll neck on this early axle, the tube and sleeve insert were swedged to a constricted cross-section. Further, it was proposed to make an axle with an annular chamber extending therethrough and formed by a cylindrical coring of the cast axle body and by extending a thin-walled tube of a lesser diameter than the coring through the coring. The annular chamber thus formed was approximately filled with a liquid for conducting the heat from the cast axle body to an exchange relation with the tube, the center of which was vented to the atmosphere. The tube was supported by threaded bushings, which operated to seal the liquid containing chamber. The stress and load applied to the axle was entirely sustained by the cast axle body of this early construction.

The most recent proposal in the art of utilizing multiple tubes to construct an axle of the class described is that in which a pair of tubes of a length not less than the distance between opposite wheel hubs was disposed in concentric nesting relation. The outer of the tubes was end-flared to provide wheel seats to which the wheels were press-fitted to rotate with the tube. The inner of the tubes was of a sufficient length to provide bearing surfaces which cooperated with the journal. The outer and inner tubes were supported in concentric bearing relation by barrel or roller bearings in the zones where a plane extending at right angles to the axis of tube-nested concentricity intersected the wheel seats of the outer tube and a section of the inner tube spaced lineally inwardly from the journal bearings.

I have found that the mentioned axles are not only costly to produce, but do not possess the entire potential and usable advantages of lightness and strength which are inherent in an axle of multiple tube construction. For example, such prior axles do not provide for the elimination of all needless metal mass from their structure without sacrifice or compensation for such elimination of the essential beam characteristics in the axle. Also, these prior art axles do not provide for wide distribution and dissipation of the forces of load and stress over the body structure of the axle, but instead utilize details which produce centralization of such forces, with resultant fatigue and crystallization in the parts subjected to such focused forces.

Accordingly, it is the general object of my invention to provide an axle in which these and other faults do not attach but which possesses new and all the advantages of these prior axles.

Another object of the invention is to provide an axle formed from multiple tubes of different inner and outer diameters disposed in concentric nesting relation, one of the tubes having integral means to sustain the tubes in spaced relation embodied in a portion of the tube wall which extends substantially radially with respect to the axis of tube concentricity, away from the directrix curve of one tube toward the directrix curve of the other tube, a distance sufficient to span the space between the tubes and equal to one-half the difference between the outer diameter of the inner tube and the inner diameter of the outer tube. By such provision, I am able to utilize outer tubes of large diameter, with correspondingly high moduli, in the bridge portions of the axle beam, in conjunction with an inner tube of the approximate dimensions of the conventional wheel hub seats and journal bearing surfaces, without the use of intermediate barrel or roller bearings between the lateral surfaces of the tubes and without extensive swedging of the tubes to form wheel seats and journal roll necks.

Another object of my invention is to provide an axle of the class described having a main tube, which may be either the inner or outer tube of the assembly, and a stepped tube, one stepped section of which extends lineally for a distance parallel to the axis of tube concentricity and has one of its inner and outer diameters equal to one of the inner and outer diameters of the main tube, so that when assembled, the surface of the stepped tube section is located in surface contact with a surface of the main tube for a measurable area. By such provision, not only will the tubes be supported in spaced concentricity, but also the tubes will be effectively integrated into a unit axle and the forces of stress exerted on one tube will be transmitted to the other over a decentralizing area with resultant dissipation and distributed counteraction.

Another object of the invention is to provide an axle of the class described having, in addition to the main and stepped tubes mentioned, a sleeve tube which is of much lesser length than either of the main or stepped tubes and which is disposed in concentric nesting relation and surface contact with one of said tubes in a zone between two planes extending at right angles to the axis of concentricity, one intersecting the main and stepped tubes in the area of surface contact between them and the other intersecting the annular space between the main tube and another section of the stepped tube. Since the described zone largely corresponds, in location, with that of the intended wheel hub seats and journal roll neck of my axle, the provision of the sleeve tube therein serves to greatly strengthen this critical zone against the stress of shear forces exerted by counteraction of the wheel hub and the journal roll neck. The area of surface contact between the sleeve tube and one of the other tubes is extensive with resultant distribution of forces transmitted or exerted in shear.

A still further and more particular object of my invention is to provide an axle of the class described particularly adapted to use as a railroad car axle and having main and stepped tubes, as heretofore characterized, one of such tubes being provided with an end tubular extension which, together with the end edge of the other tube, forms a roll neck adapted for cooperation with the railroad car's journal bearing. By such provision, the costly operation of swedging to constrict the tubes to form such roll neck may be avoided.

The invention consists in other features and advantages which will appear from the following description and upon examination of the drawing. Structures containing the invention may partake of different forms and still embody the invention. To illustrate a practical application of the invention, I have selected a vehicle axle as an example of the various structures and details thereof that contain the invention and shall describe the selected structure hereinafter, it being understood that variations may be made without departing from the spirit of the invention. The particular structure selected is shown in the accompanying drawing and described hereinafter.

Fig. 1 of the accompanying drawing illustrates a vehicle axle embodying my invention, as applied to a railroad car. Fig. 2 illustrates a longitudinal section of the axle shown in Fig. 1. Fig. 3 illustrates an enlarged view of a section taken on the plane of the line 3—3 indicated in Fig. 1. Fig. 4 illustrates an enlarged view of a section taken on the plane of the line 4—4 indicated in Fig. 1. Fig. 5 illustrates an enlarged view of a section taken on the plane of the line 5—5 indicated in Fig. 1.

The railroad car 10, shown in the drawing and to which a vehicle axle of my invention may be applied, has the conventional load carrying body 11 and oppositely disposed wheels 12 which are designed to run on tracks 14. The wheels have hubs 15 by which the wheels are mounted and the body 11 is supported on trucks (not shown), having journal bearings 16 which support the wheels 12 in load carrying relation to the body. The structure so far referred to is well known and needs no further description.

My invention, as is already apparent, provides an axle 20 which operates in conjunction with the wheels 12 and journal bearing 16 to sustain the load carried by the body 11 and withstands the shock and vibration stress in the movement of the wheels 12 over the track 14. The axle 20 comprises a plurality of relatively thin-walled steel tubes 21 and 22. Each tube is of a length equal to at least the distance between the hubs 15 of opposite wheels 12 and consequently spans the distance in the manner of integral beams. The tubes 21 and 22 are concentrically disposed in nesting relation about an axis, hereinafter referred to as the axis of concentricity.

One tube, such as the tube 21, of the plurality of tubes 21 and 22 has, in the main, greater inner and outer diameters than the inner and outer diameters of the other tube, as is illustrated in Fig. 4 of the drawing. The larger diameter tube has, by reason of the disposition of its wall portion relative to the axis of concentricity, weight for weight, a comparatively high sectional modulus and a low fiber stress in its central zones.

In order to integrate the tubes 21 and 22 into a unit structure and to support them in the desired concentric relation, one of the tubes, such as the tube 21, has an integral portion 24 of the tubular wall thereof which extends substantially radially with respect to the axis of concentricity and away from the directrix curve of said tube toward the directrix curve of the other tube 22. The distance of extension of the portion 24 is equal, measured on the outer diameter of the larger tube, to one-half the difference between the inner diameter of the outer tube and the outer diameter of the inner tube.

The portion 24, circumferentially speaking, is of annular progression around the tube 21 and forms a shoulder about which reference will be later made. In effect, the tube 21 with its provision of the portion 24 is a stepped tube in which one lineal section 25 has opposite end lineal sections 26 joined by portions 24, while the tube 22 may be contrarily distinguished as the main tube. In the above delineated sense, such nomenclature is hereinafter used, although it is not intended to convey the impression that the stepped tube is in all cases the outer-most tube or the main tube is always the inner tube.

The section 25, as will be observed, has constant inner and outer diameters throughout its length, different from the inner and outer diameters of the main tube 22. Each section 26 also has constant inner and outer diameters throughout its length which are different from the inner and outer diameters of the section 25. One of the inner and outer diameters of each section 26, in the form shown in the drawing, is equal to one of the inner and outer diameters of the main tube 22. In the particular form shown, the inner diameter of each section 26 is equal to the outer diameter of the main tube 22. Thus, the inner lateral surface of each section 26 is in surface contact with the outer lateral surface of the main tube 22 over a considerable area. The area of contact between the lateral surfaces mentioned is of the order of the entire inner lateral surface of the section 26. Preferably, the mating of the lateral surfaces mentioned is effected by a shrinking, sweating or press-fitting operation. Thus, the tubes 21 and 22 are effectively integrated to rotate and bear as a single unit. It will be apparent that forces primarily exerted on either tube will be transmitted to the other over an extended area, preventing localized strain and fatigue of either tube. This is of great importance since each section 26 is utilized as a seat to receive the hubs 15 of the wheel 12. The shoulder formed by the portion 24 marks one extremity of the wheel hub seat and operates as a thrust bearing in that relation.

To further strengthen this zone, I provide a sleeve tube 30 which is of a length shorter than either of the main or stepped tubes but greater than the section 26. The sleeve tube is disposed in concentric and nesting relation with the main and stepped tubes. In the form shown, the sleeve tube is disposed within the main tube and in a zone which extends lineally along the axis of concentricity between two planes extending at right angles to said axis, one intersecting the area of surface engagement between the main and stepped tubes and the other intersecting the annular space 31 between the main tube and section 25 of the stepped tube. The sleeve tube has inner and outer diameters, one of which is equal to one of the inner and outer diameters of one of the main tubes and a stepped tube section. In the form shown, the outer diameter of the sleeve tube 30 is equal to the inner diameter of the main tube. It will be apparent that the outer lateral surface of the sleeve tube 30 is in surface contact over a large area with the inner lateral surface of the main tube. Preferably, the assembly of the sleeve tube 30 with the main tube 22 is such that the mutually engaging lateral surfaces engage with forces produced by shrinking, sweating or press-fitting the sleeve and main tubes together. By so combining the sleeve tube with the other tubes 21 and 22, a unit structure is formed and the zone of the hub stress is materially strengthened to resist shear.

In order to dissipate and distribute the forces exerted on the sleeve tube 30, one end 32 of the sleeve tube has a progressively thinning wall section beginning at points spaced from the terminal edge of said end and extending in a direction parallel to the axis of concentricity toward said terminal edge of the tube. The thinning wall section of end 32 produces a feathered terminal annular edge 33 of a diameter equal to the inner diameter of the main tube 22. By such provision the zone of bracement, provided by the sleeve tube 30, gradually fades or merges with the portions of the tubes not so braced. Such gradual merger of braced to unbraced portions prevents, on application of stress to either the braced or unbraced portions, transmission of applied forces to sharply defined or limitedly localized points to subject such points to overfatigue, resulting in failing fracture.

In order to provide a roll neck for cooperation with the journal bearing 16, each end of one of the tubes 21 and 22 is provided with a tubular extension 35 which extends beyond the adjacent end edge 36 of the other tube. Each tubular extension 35 has, preferably, inner and outer diameters less than the inner and outer diameters of the tube, such as the main tube 22, from which it extends. However, it is found highly desirable to maintain the outer diameter of each tubular extension 35 to a magnitude not less than the inner diameter of the tube from which it extends. The end edge 36 of the stepped tube 21 and the generally radially extending portion of tube 22 joining the tubular extension 35 to tube 22 form a thrust shoulder which, in conjunction with the lateral surface of the tubular extension 35, complete a highly satisfactory roll neck to bear on the journal bearing 16.

I have found it desirable to provide the bracement of this roll neck afforded by the provision of a tubular extension 40 on the sleeve tube 30. The tubular extension 40 extends from the opposite end of the sleeve tube 30 to that on which the end 32 is formed. As shown, the outer diameter of the tubular extension 40 is equal to the inner diameter of the tubular extension 35. The same advantages of delocalized and distributed transmission of forces over material areas in the contacting lateral surfaces of the tubular extensions 35 and 40 attach, as explained heretofore in connection with the main and stepped tubes. The portions of the axle subjected to greater shear are accordingly materially reinforced to provide an assured longevity of axle use.

In fact, the axle heretofore described and shown has a generally greater modulus value to resist prevailing stresses in the critical zones of stress than a conventional forged axle presently accepted for standard use on railroad cars. This unusual characteristic of the vehicle axle of my invention does not take into consideration the comparative material lightness of an axle embodying my invention and the benefits which attend such reduction in weight.

In order to provide a thrust bearing on the roll neck in opposition to that provided by the edge 36 and to finish and close the ends of the axle, I propose that a plug 45, having a threaded skirt 46 and a discular head 47, be mounted on the outer end of each tubular extension 35 of the tube 22. The inner surface of the end of the tubular extension 35 is threaded to threadably receive the threaded skirt 46 and sustain the discular head 47 in concentric relation therewith. The diameter of the discular head 47 is greater than the outer diameter of the tubular extension 35. Thus, the head 47 when assembled with the tubular extension 35 forms a flange or outer end shoulder to complete the roll neck. Also, if desired the closed chamber 48 formed by the thus related tubes and their extensions and the plugs 45 may be untilized to contain a supply of journal lubricant or axle coolant liquids.

While I have illustrated and described the best forms of my invention now known to me, as required by the statutes, those skilled in the art will readily understand that changes may be made in the disclosed construction without departing from the spirit of my invention as set forth in the appended claims.

I claim:

1. A railroad car axle comprising a main tube and a stepped tube disposed in concentric and nesting relation, each tube of a length greater than the distance between the hubs of opposite railroad car wheels adapted to be supported on the axle and providing at opposite ends of said tubes wheel seats for said wheel hubs, the main tube being of substantially constant inner and outer diameter throughout the length thereof between said wheel seats, the stepped tube having lineal sections, each section being of substantially constant inner and outer diameter throughout its distance of extension and of a different inner and outer diameter to the inner and outer diameter of another of said sections, one of the diameters of one of the stepped tube sections being at least equal to one of the diameters of the main tube to locate a surface of said stepped tube section in engagement with a surface of the main tube over an annular area approximately equal in dimension with that of a surface of said stepped tube section and the inner and outer diameters of another of the stepped tube sections being of different dimensions than the inner and outer diameters of said main tube whereby an annular-like space is formed between the main tube surfaces and those of the last mentioned stepped tube section, one of the tubes having opposite end tubular extensions, each of a length equal to the span of a railroad journal bearing and extending axially beyond the end edge of the other tube to form, with the end edge of the other tube, a roll neck adapted for cooperation with such journal bearing.

2. A load-bearing and wheeled-vehicle axle comprising a main tube and a stepped tube disposed in concentric and nesting relation, said tubes being of a length greater than the distance between the hubs of opposite vehicle wheels adapted to be supported on the axle and providing at opposite ends of said tubes wheel seats for said wheel hubs, the main tube being of substantially constant inner and outer diameter throughout the length thereof between said wheel seats, the stepped tube having lineal sections, each section being of substantially constant inner and outer diameter throughout its distance of extension and of a different inner and outer diameter to the inner and outer diameter of another of said sections, one of the diameters of one of the stepped tube sections being at least equal to one of the diameters of the main tube to locate a surface of said stepped tube section in engagement with a surface of the main tube over an annular area approximately equal in dimension with that of a surface of said stepped tube section and the inner and outer diameters of another of the stepped tube sections being of different dimensions than the inner and outer diameters of said main tube whereby there is an annular-like space between the main tube surfaces and those of the last mentioned stepped tube section.

3. A load-bearing and wheeled-vehicle axle as described in claim 2 with the additional provision of a sleeve tube of a length less than the main and stepped tubes but greater than one of the lineal sections of said stepped tube and being disposed in concentric and nesting relation with the main and stepped tubes in a zone bounded by two parallel planes extending at right angles to the axis of tube concentricity, one of said planes intersecting the main and stepped tubes in the area of surface engagement between the main and the stepped tubes and the other of said planes intersecting the annular space between said tubes; the sleeve tube having inner and outer diameters, one of which diameters is equal to the one of the diameters of one of the other tubes in the said zone, whereby a surface of the sleeve tube is located in engagement with a surface of one of the surfaces of one of said other tubes.

4. In a load-bearing and wheeled-vehicle axle comprising a plurality of concentrically disposed nesting tubes, each of said tubes having opposite end sections and an intermediate central section, the inner and outer diameters of the end and central sections of each tube being constant through the entire length of each of said sections, one of the diameters of the end section of one tube of said plurality of tubes being equal to one of the diameters of the end section of the next adjacent nesting tube of said plurality of tubes and adapted for seating opposite vehicle wheels, and one of the diameters of the central section of one of said plurality of tubes being greater than one of the diameters of the central section of the next adjacent nesting tube of said plurality of tubes whereby said central sections of said last named tubes are annularly spaced from each other to allow independent flexure of said central sections in resisting the forces of load exerted on the end sections.

5. In a load-bearing and wheeled-vehicle axle as claimed in claim 4 in which the juncture of each end section with the central section of one of said tubes extends radially to the axis of said tube and is adapted for providing an annular shoulder cooperative with the lateral surface of each end section in seating the hub of a vehicle wheel on the axle.

6. In a load-bearing and wheeled-vehicle axle comprising a plurality of concentrically disposed nesting tubes, said tubes being of a length greater than the distance between the hubs of opposite vehicle wheels adapted to be supported on the axle and providing at opposite ends of said tubes wheel seats for said wheel hubs, the outer of said plurality of nested tubes having intermediate the wheel seats an internal diameter greater than the external diameter intermediate the wheel seats of the next adjacently disposed inner of said plurality of nested tubes; an integral portion of the wall of one of said nesting tubes extending substantially radially with respect to the axis of concentricity of said tubes and through a distance measured on the said internal diameter of the said outer tube at least equal to one-half the difference between the dimension of said inner diameter of said outer tube and the dimension of said outer diameter of said inner tube to engage the surface of the next adjacent nesting tube.

7. In a load-bearing and wheeled-vehicle axle comprising a plurality of concentrically disposed nesting tubes, said tubes being of a length greater than the distance between the hubs of opposite vehicle wheels adapted to be supported on the axle and providing at opposite ends of said tubes wheel seats for said wheel hubs, the outer of said plurality of nested tubes having intermediate the wheel seats an internal diameter greater than the external diameter intermediate said wheel seats of the next said nesting inner of said plurality of nested tubes; an integral portion of the wall of one of adjacently disposed tubes extending away from the directrix curve of said tube toward the directrix curve of the next adjacent nesting tube for a distance measured on the internal diameter of said outer tube at least equal to one-half the difference between the dimensions of said inner diameter of said outer tube and the dimension of said outer diameter of said inner tube to engage a surface of the next adjacent nesting tube.

BERTIS H. URSCHEL.

REFERENCES CITED

The following references are of record in the file of this patent:

UNITED STATES PATENTS

| Number | Name | Date |
| --- | --- | --- |
| 44,434 | Mothe | Sept. 27, 1864 |
| 352,657 | Peckham | Nov. 16, 1886 |
| 1,612,321 | Soderberg | Dec. 28, 1926 |
| 1,902,910 | Oelker | Mar. 28, 1933 |
| 2,041,162 | Buckwalter | May 19, 1936 |

FOREIGN PATENTS

| Number | Country | Date |
| --- | --- | --- |
| 13,782 | Great Britain | 1851 |
| 57,639 | Germany | Oct. 29, 1890 |
| 14,278 | Great Britain | June 28, 1898 |